(12) United States Patent
Gisler et al.

(10) Patent No.: US 9,415,541 B2
(45) Date of Patent: Aug. 16, 2016

(54) HOT WEDGE WELDING DEVICE

(71) Applicant: Leister Technologies AG, Kagiswil (CH)

(72) Inventors: Lukas Gisler, Alpnach Dorf (CH); Bruno Von Wyl, Kagiswil (CH)

(73) Assignee: Leister Technologies AG, Kagiswil (CH)

( * ) Notice: Subject to any disclaimer, the term of this patent is extended or adjusted under 35 U.S.C. 154(b) by 0 days.

(21) Appl. No.: 14/627,256

(22) Filed: Feb. 20, 2015

(65) Prior Publication Data

US 2015/0239173 A1  Aug. 27, 2015

(30) Foreign Application Priority Data

Feb. 25, 2014 (EP) ..................................... 14401030

(51) Int. Cl.

| | |
|---|---|
| *B32B 37/00* | (2006.01) |
| *B29C 65/20* | (2006.01) |
| *B29C 65/00* | (2006.01) |
| *B32B 37/06* | (2006.01) |
| *B32B 37/10* | (2006.01) |
| *B29L 7/00* | (2006.01) |

(52) U.S. Cl.
CPC ............... *B29C 65/20* (2013.01); *B29C 66/006* (2013.01); *B29C 66/1122* (2013.01); *B29C 66/43* (2013.01); *B29C 66/8163* (2013.01); *B29C 66/8362* (2013.01); *B29C 66/861* (2013.01); *B32B 37/0046* (2013.01); B32B 37/06 (2013.01); *B32B 37/10* (2013.01); *B29L 2007/00* (2013.01)

(58) Field of Classification Search
CPC .... B29C 65/20; B29C 66/1122; B29C 66/43; B29C 66/8163; B29C 66/8362; B29C 66/861
USPC ....................... 156/499, 555, 580, 582, 583.1
See application file for complete search history.

(56) References Cited

U.S. PATENT DOCUMENTS

| 4,146,419 | A | * | 3/1979 | Neidhart | B29C 65/20 156/391 |
|---|---|---|---|---|---|
| 4,872,941 | A | * | 10/1989 | Lippman | B29C 65/10 156/497 |
| 5,051,148 | A | * | 9/1991 | Resch | B29C 65/02 156/358 |
| 5,169,052 | A | * | 12/1992 | Kaminski | B29C 65/20 156/391 |
| 5,328,545 | A | * | 7/1994 | Kaminski | B29C 65/20 100/171 |
| 6,050,317 | A | * | 4/2000 | Weissfloch | B29C 66/1122 156/499 |

FOREIGN PATENT DOCUMENTS

| CA | 1096286 | 2/1981 |
|---|---|---|
| DE | 27 00 971 A1 | 8/1977 |
| DE | 297 19 434 U1 | 2/1998 |

OTHER PUBLICATIONS

European Search Report for corresponding European Application No. EP 14 40 1030 mailed Sep. 25, 2014.

* cited by examiner

*Primary Examiner* — James Sells
(74) *Attorney, Agent, or Firm* — Renner, Otto, Boisselle & Sklar, LLP

(57) ABSTRACT

A hot-wedge welding device for overlap welding plastic webs, comprising a hot wedge, a pressure device for pressing the plastic webs against the hot wedge which comprises a respective pressure unit associated with one of the hot-wedge flat sides, and further comprising two mutually opposing pressure rollers. The hot wedge is pivotably mounted on a bearing shaft by way of a bearing bushing, which extends between the two hot-wedge flat sides parallel to the hot-wedge front edge at a distance therefrom. The hot wedge is mounted to have defined degrees of freedom with respect to the bearing shaft in the longitudinal direction and in the transverse direction of the bearing bushing, which in addition to the rotational movement of the hot wedge about the transverse axis thereof, also allow a tilting movement of the hot wedge about the longitudinal axis thereof and a vertical displacement of the hot wedge.

4 Claims, 2 Drawing Sheets

HOT WEDGE WELDING DEVICE

CROSS-REFERENCE TO RELATED APPLICATION

The present application claims priority under 35 USC §119 to European Patent Application No. 14 401 030.3, filed Feb. 25, 2014, the entire disclosure of which is incorporated herein by reference.

TECHNICAL FIELD

The present disclosure relates to a hot-wedge welding device for overlap welding plastic webs, comprising a hot wedge that has two hot-wedge flat sides, which start at a hot-wedge rear face and adjoin one another at a hot wedge front edge, and is attached to a chassis borne by drive rollers with the hot wedge front edge oriented counter to the direction of movement during welding, wherein the hot wedge can be moved relative to the plastic webs in a welding section of an overlap region between these webs so as to plasticize the welding section, further comprising a pressure device for pressing the plastic webs against the hot wedge which comprises two pressure units, each of which being associated with one of the hot-wedge flat sides, and further comprising two mutually opposing pressure rollers, between which a plasticized welding section passes during welding.

DESCRIPTION OF THE RELATED ART

Hot-wedge welding devices of the type in question having heatable hot wedges are known in a wide variety of embodiments and are frequently used, in particular, to automatically seal the edges of plastic webs by way of welding. When overlap welding plastic webs by way of the hot wedge, the plastic webs are plasticized at the contact surfaces thereof and subsequently welded together under the action of pressure. Typically, the bottom one of the two rotatably mounted pressure rollers is directly connected to the chassis, and the other top pressure roller is attached to the chassis by way of a tensioning arm, which presses the top pressure roller against the bottom pressure roller by way of a spring force. When the plastic webs are being tensioned between the two pressure rollers, the top pressure roller exerts a high tension force, resulting in torsion in the chassis, so that the rotatably mounted pressure rollers no longer extend exactly parallel to the hot wedge front edge such that the top pressure roller, which is typically mounted on the tensioning arm by way of a swivel head, conforms to the position of the bottom pressure roller. This can result in distortion of the plasticized welding section in the overlap region of the plastic webs, which adversely affects the weld quality of the plastic webs since expenditure of additional force is required for the hot wedge to conform to the overlap region. This additional action of force on the welding section of the overlap region is not optimal for the welding process.

Proceeding from the above prior art, it is the object to propose an option in which the hot wedge is able to conform to the respective orientations of the two pressure rollers without the influence of a force, or with little influence of a force.

This object is achieved by a hot-wedge welding device having the features described herein. Further advantageous embodiments can be found in the claims dependent thereon.

SUMMARY

The hot-wedge welding device comprises a hot wedge that is mounted by way of at least one bearing bushing, which extends between the two hot-wedge flat sides, parallel to the hot wedge front edge and the hot-wedge rear face at a distance therefrom, so as to be pivotable on a bearing shaft and thereby inclinable about the transverse axis of the hot wedge. Depending on the axial length of the at least one bearing bushing compared to the bearing shaft, the hot wedge can comprise one or more bearing bushings, which are disposed next to each other, with or without axial distance from each other. Two flat disk-shaped bearing bushings, which are disposed directly on the hot wedge side faces laterally connecting the hot-wedge flat sides, have proven to be particularly advantageous. This type of attachment of the hot wedge to the chassis allows independent adjustment of the inclination relative to the transverse axis of the same, which is predetermined by the design, wherein the hot wedge can also be preadjustable by way of provided adjusting means, and in particular automatic orientation at the hot-wedge front edge. The hot wedge can independently conform to the respective positions of the two pressure rollers by way of the bearing bushing being capable of limited rotational movement, relative to the bearing shaft, in the circumferential direction of the bearing shaft. As a result of the rotational movement of the hot wedge, the hot-wedge front edge is exactly oriented in accordance with the height of a center plane between the two pressure rollers, which is to say in the vertical direction, relative to the two pressure rollers.

In principle, the bearing bushing, which extends parallel to the hot-wedge front edge, can be disposed in any arbitrary position on the hot wedge. An embodiment is preferred in which the bearing bushing is disposed as centrally as possible on the hot wedge, which is to say at approximately equal distance from the hot-wedge front edge and a hot-wedge rear face extending parallel thereto at a distance therefrom. It has proven favorable to dispose the bearing bushing at a distance with respect to the center of the hot wedge, which is no more than approximately 10 percent of the distance between the hot-wedge front edge and the hot-wedge rear face. This causes the hot-wedge rear face to lower to approximately the same extent as the hot-wedge front edge raises, or to raise accordingly when the hot-wedge front edge lowers. In this way, no force, or almost no force, is applied to the film webs during movement of the hot wedge, and consequently they are not undesirably deformed. The hot-wedge bearing assembly consisting of the bearing bushing and the bearing shaft is therefore ideally disposed exactly at the center between the hot-wedge front edge and the hot-wedge rear face.

In the hot wedge of the hot-wedge welding device, the at least one bearing bushing preferably has defined axial and/or radial degrees of freedom with respect to the bearing shaft so that the hot wedge can be tilted about the longitudinal axis thereof and/or displaced vertically in the direction of the pressure units. During tilting, the bearing bushing can carry out a limited translational movement and a limited radial tilting movement in the transverse direction of the bearing shaft. In general, the cross-sectional shape of the bearing bushing and the cross-sectional shape of the bearing shaft can be arbitrarily selected as long as these allow at least a pivoting motion in the circumferential direction of the bearing shaft and a tilting movement with respect to the longitudinal direction of the bearing shaft of the hot wedge. The contours and the dimensions of the cross-sectional shapes of the bearing bushing and of the bearing shaft can be the same or different. It is also possible for the bearing bushing and/or the bearing shaft to have a cross-sectional shape that is not consistent across the length, such that the cross-sectional shape varies across the longitudinal direction, wherein the bearing bushing preferably widens toward the ends thereof and the bearing shaft preferably narrows toward the ends thereof.

The tiltability and/or vertical displaceability of the hot wedge is preferably achieved by differing cross-sectional shapes and/or lengths of the bearing bushing and the bearing shaft. Due to the inclinable, tiltable and vertically displaceable hot-wedge bearing assembly on the bearing shaft, the height position and the inclination position of the hot-wedge front edge can vary arbitrarily within predefined boundaries in this specific embodiment. The mutually deviating outer contours and/or the mutually deviating dimensions of the bearing bushing and the bearing shaft thus allow for simple and forceless orientation of the hot wedge, so as to achieve the height dimension or predefined angular dimension which is predefined by the two pressure rollers, and at which at least the hot-wedge front edge optimally conforms to the position with respect to the two pressure rollers.

According to an embodiment, the hot wedge is mounted so as to be axially displaceable on the bearing shaft to a certain degree, which is defined by the design as a result of the axial degree of freedom of the bearing bushing relative to the bearing shaft in the transverse direction. As a result of the radial degree of freedom of the bearing bushing relative to the bearing shaft in the transverse direction of the bearing shaft, the hot wedge can also be radially tilted on the bearing shaft in a laterally vertical manner. In one embodiment in which the two hot wedge side faces are designed to be planar, the lateral tilting of the hot wedge on the bearing shaft is only possible in conjunction with the axial degree of freedom of the bearing bushing relative to the bearing shaft.

In another embodiment, the hot wedge can also be tilted on the bearing shaft without the degree of freedom of the bearing bushing relative to the bearing shaft, in the longitudinal direction of the bearing shaft, so long as the two hot wedge side faces connecting the hot-wedge flat sides are not planar, at least in the region of the bearing bushing, but rather have a convex rounded design, for example. Otherwise tilting of the hot wedge on the bearing shaft is only possible if the bearing bushing is shorter than the bearing shaft.

The possible tilt directions of the hot wedge correspond to the possible movement directions of the bottom pressure roller during the tensioning of the overlap region of the plastic webs by the top pressure roller. The bottom pressure roller is acted on vertically by the tension force of the top pressure roller and is deflected substantially in the corresponding direction. The hot wedge can thus forcelessly conform to the two pressure rollers, in particular in terms of the height position and the inclination position of the hot-wedge front edge.

In the hot-wedge welding device, the bearing bushing is preferably designed to have the cross-sectional shape of an elongated hole and the bearing shaft is designed to have a round cross-sectional shape, wherein clearances are formed, respectively above and beneath the bearing shaft, between the bearing bushing and the bearing shaft. The present clearance typically allows the hot wedge to tilt by approximately 5 degrees on the bearing shaft with respect to the horizontal spatial direction and to be vertically displaced. A corresponding reverse embodiment of the bearing bushing and bearing shaft is also possible. In any case, the main direction of extension, of the cross-sectional elongated hole shape of the bearing bushing, or of the bearing shaft, is vertical with respect to a center plane between the two pressure rollers, which extends orthogonally to a connecting line of the pivot points of the two pressure rollers. The main direction of extension is parallel to the connecting line of the pivot points of the two pressure rollers, so that the horizontally disposed hot wedge is mounted so as to be able to swing in the transverse direction, and the hot-wedge side faces can thus move upward or downward relative to the two pressure rollers. The possible angular deflection of the hot wedge out of the horizontal position is determined by the differing diameters of the bearing bushing and the bearing shaft in the vertical direction, which is to say by the overlength of the cross-sectional shape of the bearing bushing.

An advantage of the hot-wedge welding device over the known prior art, which should be mentioned, is that the hot wedge is mounted so as to be able to carry out a defined rotation about the transverse axis thereof, a defined tilt about the longitudinal axis thereof, and a vertical displacement in the direction of the two pressure units with respect to the center plane between the two pressure rollers. The hot wedge can thus conform, without the influence of a force, to the deformation of the chassis and the associated tilting of the two pressure rollers relative to the horizontal. This not only has a positive influence on the weld quality during the welding of the plastic webs, but also allows higher weld speeds with good weld quality. It is thus ensured that the position of the hot wedge always conforms exactly to the top and bottom pressure rollers.

The device will be described hereafter in more detail based on one exemplary embodiment that is illustrated in the drawings. Additional features will be apparent from the following description of the exemplary embodiment in conjunction with the claims and the accompanying figures. The individual features can be implemented either alone or together, in different embodiments. In the drawings:

DETAILED DESCRIPTION

Figure 1:
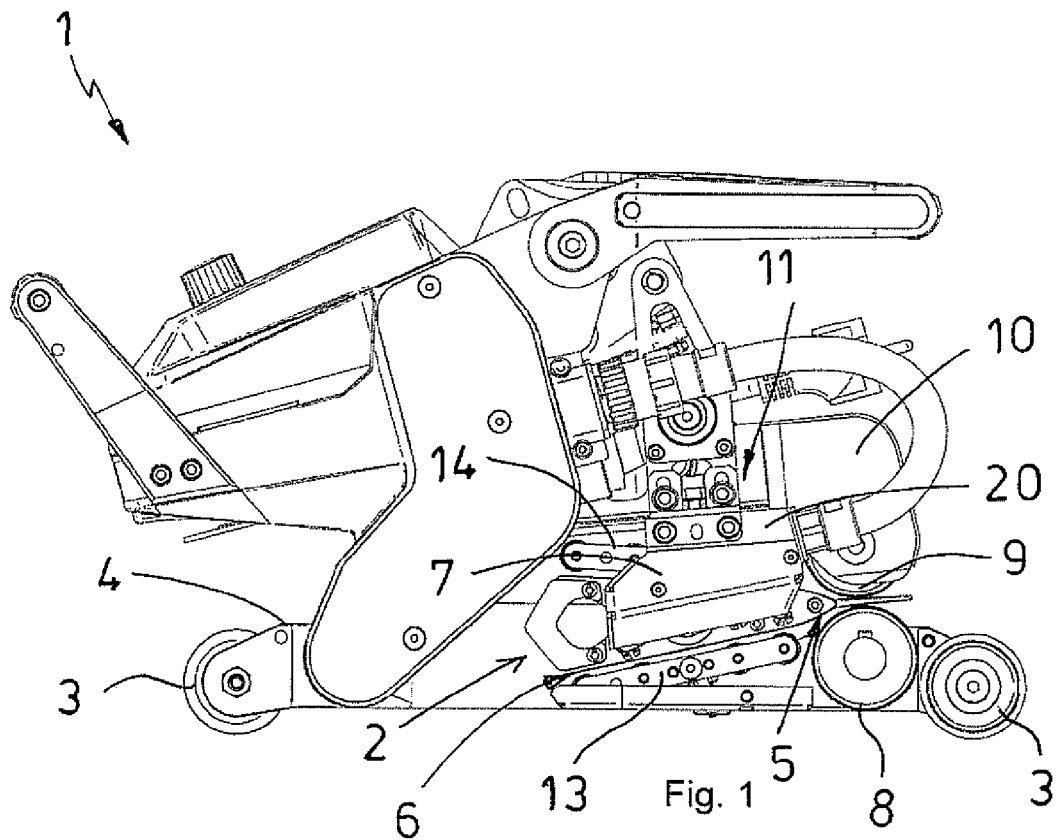
FIG. 1 shows a hot-wedge welding device comprising a hot wedge disposed on a chassis, a pressure device for the hot wedge, and two pressure rollers for the weld seam.
Figure 2:
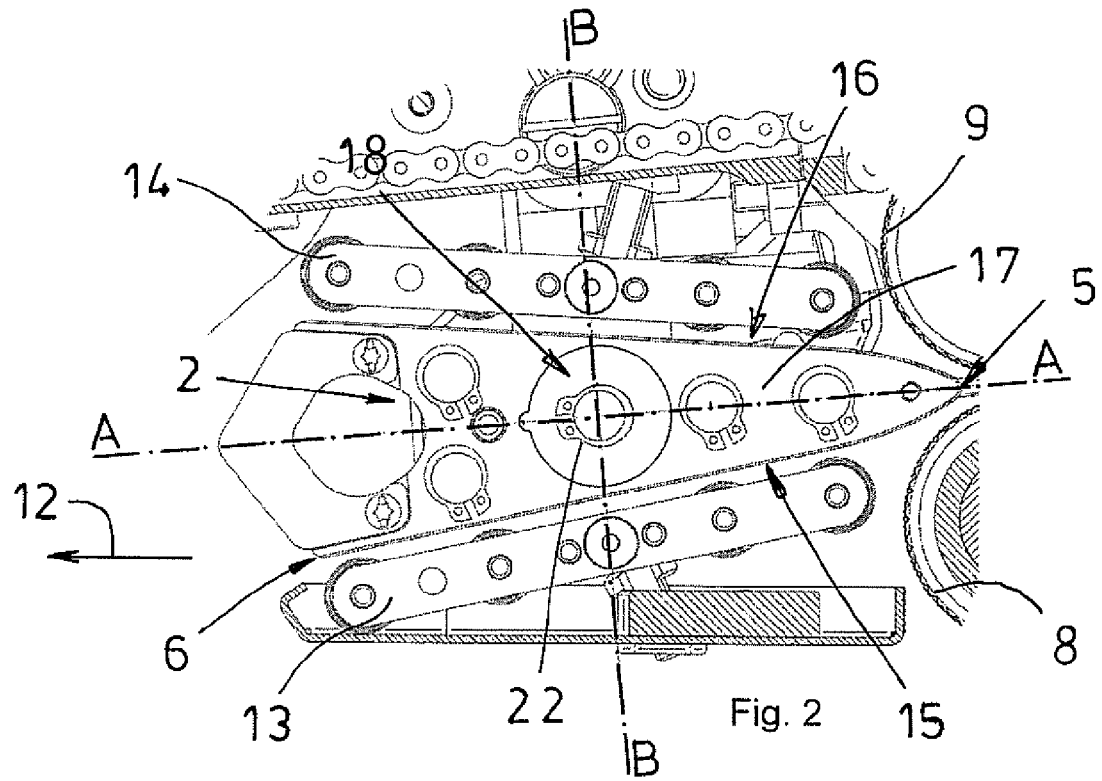
FIG. 2 shows an enlarged section of the hot-wedge bearing assembly of FIG. 1.

FIG. 1 shows an exemplary embodiment of the hot-wedge welding device 1 for overlap welding plastic webs by way of a hot wedge 2, which is attached to a chassis 4 borne by drive rollers 3. The plastic webs are not shown in FIG. 1. The hot wedge 2 includes a hot-wedge front edge 5 and a hot-wedge rear face 6, the hot-wedge front edge 5 being oriented counter to the direction of movement 12 of the hot-wedge welding device 1 during welding. The hot-wedge front edge 5 of the hot wedge 2 is disposed close to a bottom pressure roller 8 and a top pressure roller 9, the hot wedge being partially covered by a hot wedge cover 7 in FIG. 1. The bottom pressure roller 8 is rigidly connected to the chassis 4. The top pressure roller 9 is mounted in a swivel head 10 that is disposed on a tensioning arm 11, which in turn is connected to the chassis 4. Close to the hot wedge 2, the hot-wedge welding device 1 comprises a pressure device for pressing the plastic webs to be welded against the hot wedge 2, the pressure device comprising two pressure units 13, 14 for a plasticized welding section of the overlap region of the plastic webs, which are not shown. FIG. 2 shows an enlarged illustration of the region of the hot-wedge welding device 1 around the hot wedge 2 without the hot wedge cover 7, which in FIG. 1 partially covers the hot wedge 2.

As is apparent from FIG. 2, the bottom pressure unit 13 presses the bottom plastic web, which is not shown, against a bottom hot wedge flat side 15, and the top pressure unit 14 presses the overlapping plastic web, which is not shown, against a top hot wedge flat side 16 of the hot wedge 2. The hot wedge 2 moreover has two hot-wedge side faces 17, which extend from the hot-wedge front edge 5 to the hot-wedge rear face 6 and connect the top hot wedge flat side 16 to the bottom hot wedge flat side 15 at the sides of the hot wedge 2. The hot-wedge flat sides 15, 16 extend at an incline with respect to each other and orthogonally to the two hot-wedge side faces 17, which are disposed in the horizontal direction. The hot wedge 2 is attached to the chassis 4 by way of a bearing assembly 18. The bearing assembly 18 is disposed substantially centrally in the longitudinal direction of the hot wedge 2.

Figure 3:
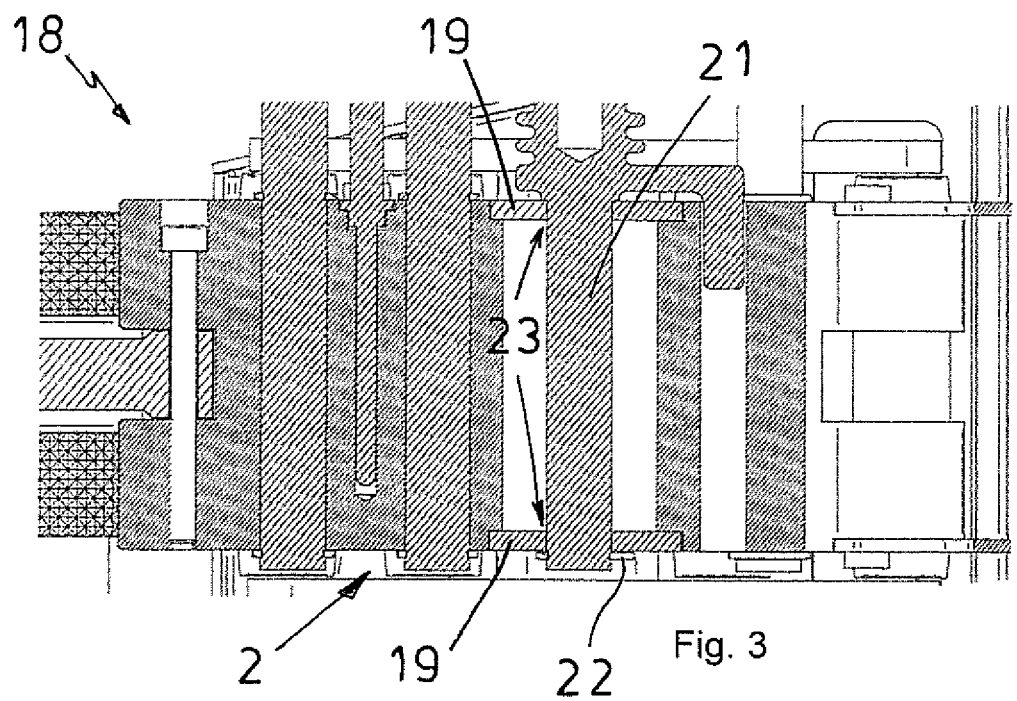
FIG. 3 shows a longitudinal sectional illustration of the hot-wedge bearing assembly according to FIG. 2 (intersecting line A-A)
Figure 4:
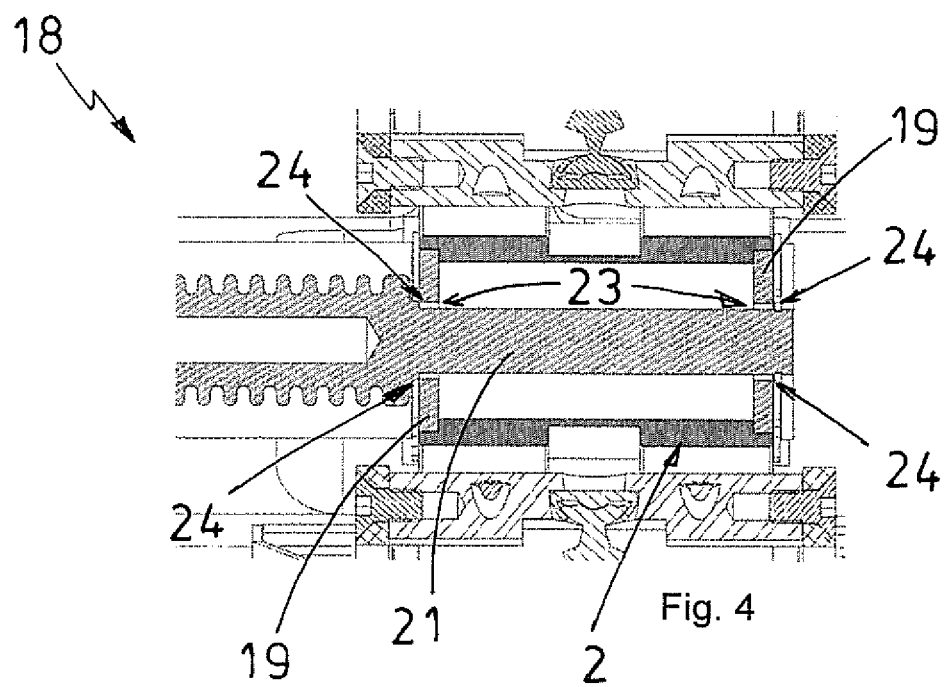
FIG. 4 shows a cross-sectional illustration of the hot-wedge bearing assembly according to FIG. 2 (intersecting line B-B).

The hot wedge 2 comprises two bearing bushings 19, which are shown in FIGS. 3 and 4 and disposed aligned with one another at a distance, and a bearing shaft 21, which is associated with the bearing bushings 19 and originates from a hot wedge mounting 20 connected to the chassis 4. The bearing shaft 21 and the bearing bushings 19 form the bearing assembly 18 for the hot wedge 2. The hot wedge 2 is pivotably mounted on the bearing shaft 21 and can carry out a defined rotation about the transverse axis thereof. The hot wedge 2 is additionally able to carry out a defined tilt relative to the longitudinal axis thereof, and a vertical displacement relative to the center plane between the two pressure rollers. The hot wedge 2 thus has defined degrees of freedom with respect to the bearing shaft 21 in the longitudinal direction and in the transverse direction of the bearing bushing 19 or the bearing shaft 21. As a result of the degree of freedom of the bearing bushing 19 in the longitudinal direction of the bearing shaft 21, and as a result of the degree of freedom of the bearing bushing 19 with respect to the bearing shaft 21 in the transverse direction of the bearing shaft 21, the hot wedge 2 is mounted on the bearing shaft 21 in an axially and radially displaceable manner and a radially tiltable manner.

FIG. 3 shows the bearing assembly 18 of the hot wedge 2 again enlarged in a longitudinal sectional illustration. The hot wedge 2 is fitted onto a cylindrical bearing shaft 21 and secured against detachment from the bearing shaft 21 by way of a retaining ring 22. For this purpose, each of the two mutually facing hot-wedge side faces 17 has an elongated hole-like cut-out 23, which serve as the bearing bushing 19. The elongated hole-like cut-out 23 is oriented on the hot wedge 2 such that the main direction of extension thereof extends in the direction of the top and bottom hot-wedge flat sides 15, 16. In the direction transverse thereto, the cut-out 23 has a dimension that is adapted to the diameter of the cylindrical bearing shaft 21, as is shown in FIG. 3. This limits the radial degree of freedom of the bearing bushing 19 with respect to the bearing shaft 21 to the vertical direction with respect to the center plane between the two pressure rollers.

Corresponding to FIG. 4, which shows the bearing assembly 18 of the hot wedge 2 in a cross-sectional illustration, the hole-like cut-out 23 which is elongated in the direction of the two hot-wedge flat sides 15, 16 is designed to be larger than the diameter of the cylindrical bearing shaft 21. Respective clearances 24 are present between the bearing shaft 21 and the bearing bushing 19 formed by the two cut-outs 23 in the two hot-wedge side faces 17, the clearance allowing the horizontally disposed hot wedge 2 to tilt in the vertical direction corresponding to the degree of the clearance 24. The hot wedge 2 can thus conform, in the longitudinal direction and in the transverse direction, to the position of the welding section of the overlap region of the plastic webs determined by the bottom pressure roller 8 and the top pressure roller 9. In this way it is ensured that the hot wedge 2 always has the same optimal position with respect to the top and bottom pressure rollers 8, 9.

Although the device has been shown and described with respect to certain embodiments, it is obvious that equivalents and modifications will occur to others skilled in the art upon the reading and understanding of the specification. The device includes all such equivalents and modifications, and is limited only by the scope of the following claims.

The invention claimed is:

1. A hot-wedge welding device for overlap welding plastic webs, comprising a hot wedge that has two hot-wedge flat sides which start at a hot-wedge rear face and adjoin one another at a hot-wedge front edge, and is attached to a chassis borne by drive rollers with the hot-wedge front edge oriented counter to the direction of movement during welding, wherein the hot wedge can be moved relative to the plastic webs in a welding section of an overlap region between these webs so as to plasticize the welding section, further comprising a pressure device for pressing the plastic webs against the hot wedge, which comprises two pressure units, each of which being associated with one of the hot-wedge flat sides, and further comprising two mutually opposing pressure rollers, between which a plasticized welding section passes during welding, wherein the hot wedge is mounted by way of at least one bearing bushing, which extends between the two hot-wedge flat sides parallel to the hot-wedge front edge and the hot-wedge rear face at a distance therefrom, so as to be pivotable on a bearing shaft and thereby inclinable about the transverse axis of the hot wedge.

2. The hot-wedge welding device according to claim 1, wherein the bearing bushing has defined axial and/or radial degrees of freedom with respect to the bearing shaft so that the hot wedge can be tilted about the longitudinal axis thereof and/or displaced vertically in the direction of the pressure units.

3. The hot-wedge welding device according to claim 2, wherein the hot wedge can be displaced axially on the bearing shaft in the longitudinal direction of the bearing shaft.

4. A hot-wedge welding device according to claim 1, wherein the bearing bushing has the cross-sectional shape of an elongated hole, and the bearing shaft has a round cross-sectional shape, so that clearances are formed above and beneath the bearing shaft between the bearing bushing and the bearing shaft.

* * * * *